(12) United States Patent
Gergis et al.

(10) Patent No.: US 11,607,928 B2
(45) Date of Patent: Mar. 21, 2023

(54) METHOD AND APPARATUS FOR COOLING AN AIR CONDITIONING SYSTEM CONTROLLER

(71) Applicant: Mobile Climate Control, Corp., Goshen, IN (US)

(72) Inventors: Adel Gergis, York, PA (US); Igor Galaev, Goshen, IN (US); Eric Weiss, Vaughan (CA)

(73) Assignee: Mobile Climate Control, Corp., Goshen, IN (US)

( * ) Notice: Subject to any disclaimer, the term of this patent is extended or adjusted under 35 U.S.C. 154(b) by 949 days.

(21) Appl. No.: 15/917,040

(22) Filed: Mar. 9, 2018

(65) Prior Publication Data
US 2018/0257458 A1    Sep. 13, 2018

Related U.S. Application Data

(60) Provisional application No. 62/469,868, filed on Mar. 10, 2017.

(51) Int. Cl.
*B60H 1/32* (2006.01)
*B60H 1/00* (2006.01)

(52) U.S. Cl.
CPC ....... *B60H 1/3208* (2013.01); *B60H 1/00271* (2013.01); *B60H 1/00428* (2013.01); *B60H 2001/003* (2013.01); *B60H 2001/3238* (2013.01); *B60H 2001/3241* (2013.01); *B60H 2001/3273* (2013.01); *B60H 2001/3277* (2013.01); *B60H 2001/3292* (2013.01)

(58) Field of Classification Search
CPC .............. B60H 1/3208; B60H 1/00271; B60H 1/00428; B60H 1/323; B60H 2001/003; B60H 2001/3238; B60H 2001/3241; B60H 2001/3292; B60H 2001/3277; B60H 2001/3273; F25B 1/10; F25B 1/04; F25B 5/00; F25B 31/006; F25B 41/003; F25B 49/02; F25B 2600/021; F25B 2600/2519; F25B 2600/2501; F25B 2700/21156; Y02B 30/741
See application file for complete search history.

(56) References Cited

U.S. PATENT DOCUMENTS 4,991,400 A * 2/1991 Wilkinson ............... F25B 27/00
                                                         62/323.3
5,764,011 A    6/1998 Nakae et al.
(Continued)

FOREIGN PATENT DOCUMENTS

EP       2916383 A1 * 9/2015 ......... B60H 1/00278
KR    20-0219608 Y1    5/2001
(Continued)

OTHER PUBLICATIONS

PCT International Search Report and Written Opinion completed by the ISA/KR dated Jun. 22, 2018 and issued in connection with PCT/US2018/021987.

*Primary Examiner* — Kun Kai Ma
(74) *Attorney, Agent, or Firm* — Barnes & Thornburg LLP (57) ABSTRACT

An air conditioning system for use with a vehicle is configured to provide conditioned air. The air conditioning system includes a controller configured to vary a flow of the conditioned air and the controller is arranged to be cooled by the conditioned air.

8 Claims, 5 Drawing Sheets

(56) References Cited

U.S. PATENT DOCUMENTS

| | | | | |
|---|---|---|---|---|
| 2003/0079484 A1* | 5/2003 | Matsuoka | ............ | B60H 1/3222 |
| | | | | 62/180 |
| 2004/0247458 A1* | 12/2004 | Iwanami | ................ | F04B 49/06 |
| | | | | 417/410.5 |
| 2006/0018764 A1* | 1/2006 | Schnetzka | ............... | F04C 29/06 |
| | | | | 417/15 |
| 2007/0204637 A1 | 9/2007 | Fujii et al. | | |
| 2007/0289322 A1* | 12/2007 | Mathews | ................ | F24F 11/77 |
| | | | | 62/225 |
| 2008/0310112 A1* | 12/2008 | Long | .................... | H05K 5/0213 |
| | | | | 361/701 |
| 2011/0020676 A1* | 1/2011 | Kurosawa | ......... | H01M 10/6557 |
| | | | | 429/62 |
| 2012/0159978 A1* | 6/2012 | Shih | .................. | B60H 1/00278 |
| | | | | 62/180 |
| 2013/0069591 A1* | 3/2013 | Iyasu | ....................... | H02J 7/14 |
| | | | | 320/109 |
| 2014/0010671 A1* | 1/2014 | Cryer | ...................... | E21B 43/26 |
| | | | | 290/45 |
| 2015/0300708 A1 | 10/2015 | Kennedy | | |
| 2016/0318371 A1* | 11/2016 | Yoshimi | ............. | B60H 1/00428 |

FOREIGN PATENT DOCUMENTS

| | | | | |
|---|---|---|---|---|
| KR | 10-2014-0043292 A | 4/2014 | | |
| WO | WO-2012100212 A1 * | 7/2012 | .............. | F02B 47/08 |

* cited by examiner

METHOD AND APPARATUS FOR COOLING AN AIR CONDITIONING SYSTEM CONTROLLER

CROSS REFERENCE TO RELATED APPLICATIONS

This application claims priority to and the benefit of U.S. Provisional Patent Application No. 62/469,868, filed 10 Mar. 2017, the disclosure of which is now expressly incorporated herein by reference.

FIELD OF THE DISCLOSURE

The present disclosure relates generally to air conditioning systems, and more specifically to air conditioning systems adapted for use in vehicles.

BACKGROUND

Typical air conditioning systems include a controller configured to vary a temperature or flow rate of the conditioned air provided by the air conditioning system. Some air conditioning systems are incorporated into vehicles to cool a passenger compartment of the vehicle.

SUMMARY

The present disclosure may comprise one or more of the following features and combinations thereof.

An air conditioning system includes an electric energy source configured to provide electric energy, an air conditioner, and a frequency drive. The air conditioner may include a compressor and an evaporator. The compressor may be configured to be driven by the electric energy. The evaporator may include a coil and a fan configured to conduct air across the coil to provide conditioned air during operation of the air conditioner. The frequency drive may be connected with the electric energy source and the compressor. The frequency drive may be configured to direct the electric energy from the electric energy source to the compressor and to vary at least one of a frequency and a voltage of the electric energy to vary at least one of a speed and a torque of the compressor to meet a desired cooling load of the air conditioner. The frequency drive may be positioned in a flow path of the conditioned air to cause the conditioned air to cool the frequency drive during use of the air conditioning system.

In illustrative embodiments, the frequency drive comprises a variable frequency drive. In illustrative embodiments, the variable frequency drive is positioned downstream of the coil.

In some embodiments, the variable frequency drive is positioned upstream of the coil.

In illustrative embodiments, the electric energy source includes at least one of a battery, capacitor, and a motor-generator. In illustrative embodiments, the compressor of the air conditioner is driven directly by the electric energy.

In illustrative embodiments, the frequency drive includes a liquid-cooled frequency drive. The air conditioning system further includes a heat exchanger fluidly connected with the liquid-cooled frequency drive.

In illustrative embodiments, at least a portion of the heat exchanger is positioned in the flow path of the conditioned air. In illustrative embodiments, the frequency drive includes a thermal portion that generates heat during use and the thermal portion is positioned in the flow path of the conditioned air.

According to another aspect of the disclosure, an air conditioning system includes an air conditioner and a controller. The air conditioner is configured to provide conditioned air during use of the air conditioner. The air conditioner may include a compressor configured to be driven by electric energy. The controller may be electrically connected with the compressor. The controller may be configured to vary at least one of a speed and a torque of the compressor. At least a portion of the controller may be positioned in a flow path of the conditioned air.

In illustrative embodiments, the controller comprises a variable frequency drive. In illustrative embodiments, the air conditioner further includes an evaporator and the variable frequency drive is located in the flow path of the conditioned air downstream of the evaporator.

In illustrative embodiments, the air conditioning system includes a battery connected with the variable frequency drive. The battery may be configured to direct the electric energy having a direct current to the variable frequency drive.

In illustrative embodiments, the controller may include a liquid-cooled variable frequency drive electrically connected with the compressor and a heat exchanger that is fluidly connected with the liquid-cooled variable frequency drive. At least a portion of the heat exchanger may be positioned in the flow path of the conditioned air.

According to another aspect of the disclosure, a method may include a number of the steps. The method may include providing an air conditioner configured to provide conditioned air, the air conditioner including a compressor and an evaporator in fluid communication with the compressor, connecting a controller with the compressor, the controller configured to vary at least one of a speed and a torque of the compressor, and positioning a thermal portion of the controller in a flow path of the conditioned air.

In illustrative embodiments, the method further includes driving the compressor with electric energy. In illustrative embodiments, the controller is configured to vary at least one of a frequency and a voltage of the electric energy to vary at least one of the speed and the torque of the compressor.

In illustrative embodiments, the thermal portion of the controller comprises a variable frequency drive. In illustrative embodiments, the controller comprises a liquid-cooled variable frequency drive and a heat exchanger in fluid communication with the liquid-cooled variable frequency drive and the thermal portion of the controller comprises at least a portion of the heat exchanger. In illustrative embodiments, the method further includes positioning the liquid-cooled variable frequency drive out of the flow path of the conditioned air.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
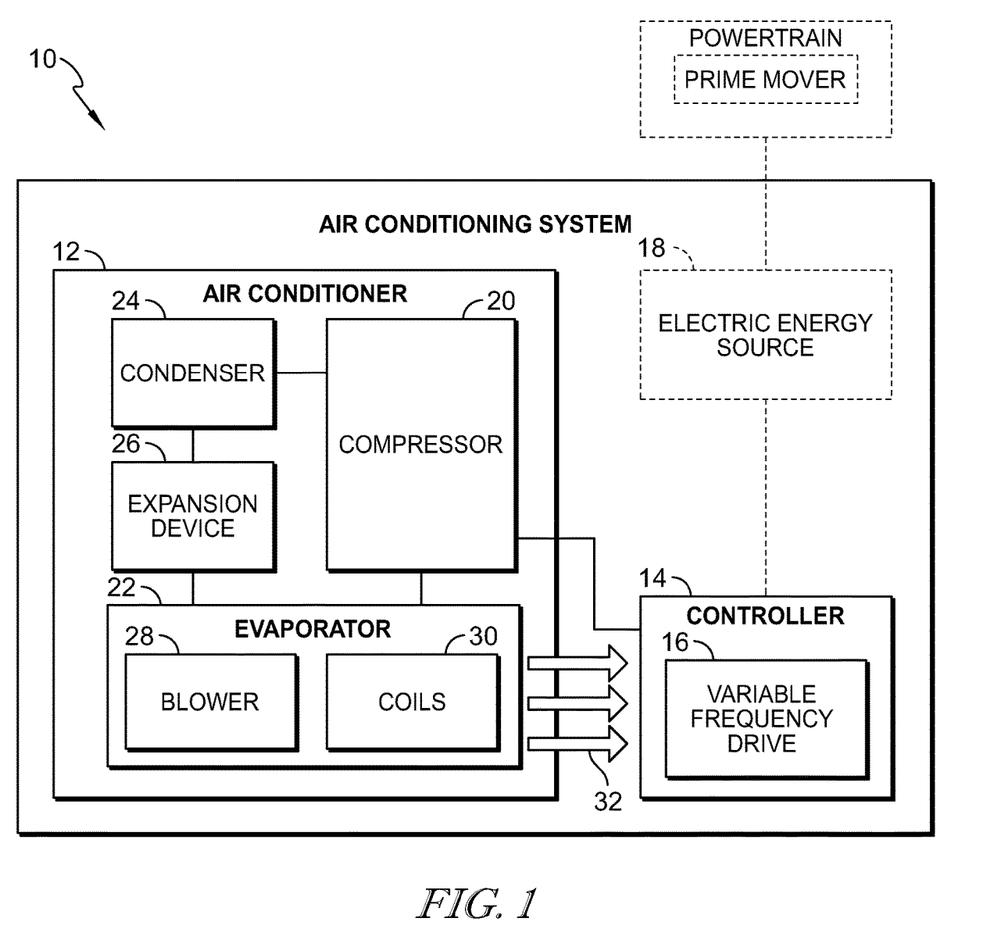
FIG. 1 is a diagrammatic view of an air conditioning system in accordance with the present disclosure showing that the air conditioning system includes an air conditioner, a controller, and optionally an electric energy source such as, for example, a battery, capacitor, motor-generator, and any combination thereof and that the controller includes a variable frequency drive configured to be cooled by the conditioned air produced by the air conditioner.
Figure 2:
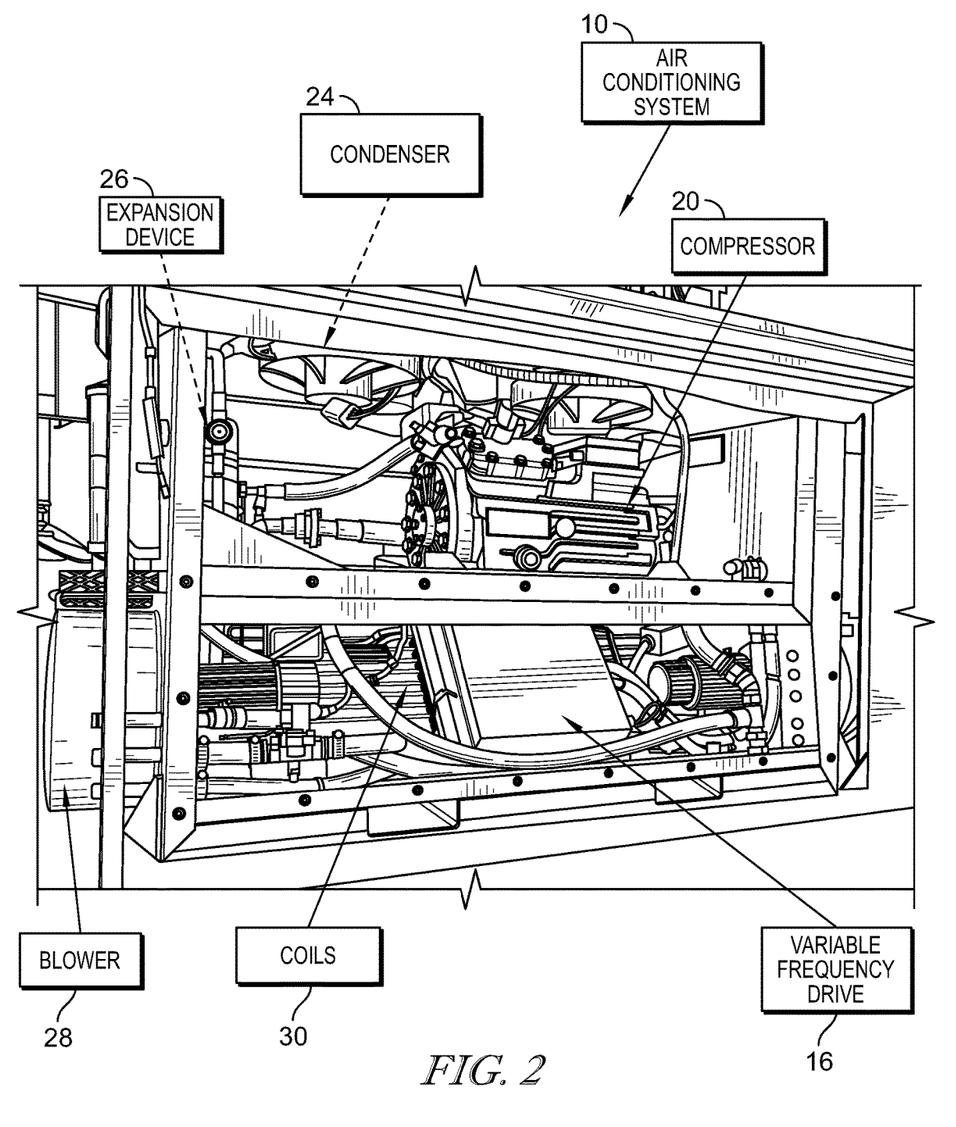
FIG. 2 is a perspective and diagrammatic view of the air conditioning system of FIG. 1.
Figure 3:
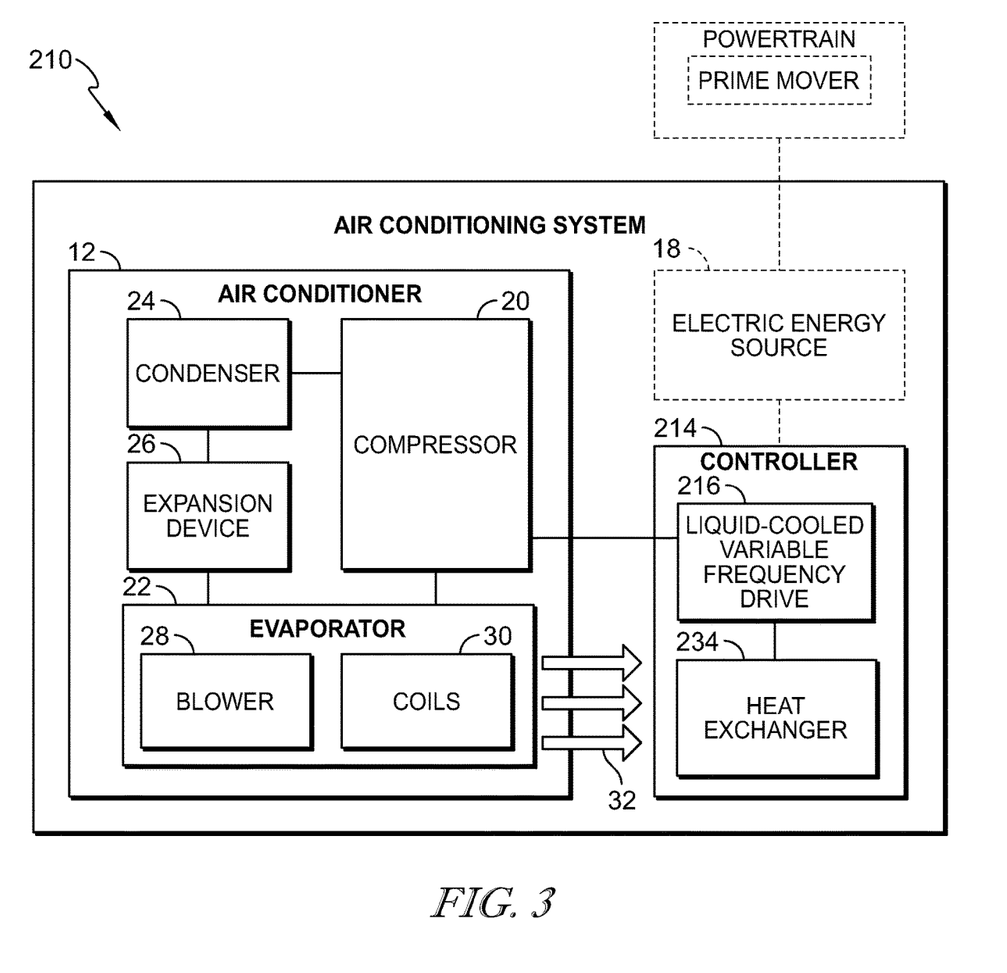
FIG. 3 is a diagrammatic view of an another embodiment of an air conditioning system in accordance with the present disclosure showing that the air conditioning system includes an air conditioner, a controller, and optionally an electric energy source and that the controller includes a liquid-cooled variable frequency drive and a heat exchanger fluidly coupled to the liquid-cooled variable frequency drive and the heat exchanger is configured to be cooled by conditioned air produced by the air conditioner during use of the air conditioner.
Figure 4:
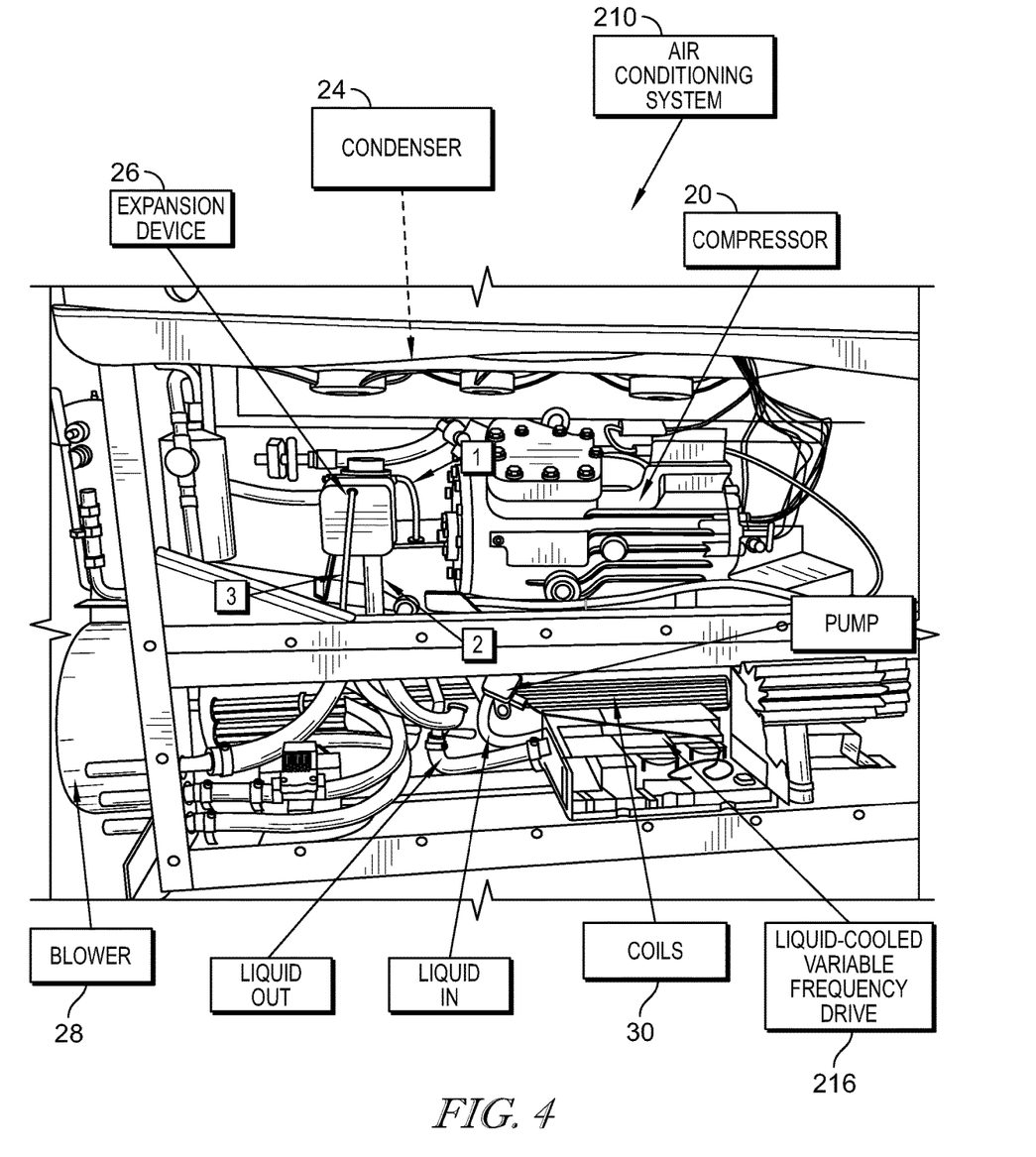
FIG. 4 is a perspective and diagrammatic view of the air conditioning system of FIG. 3.
Figure 5:
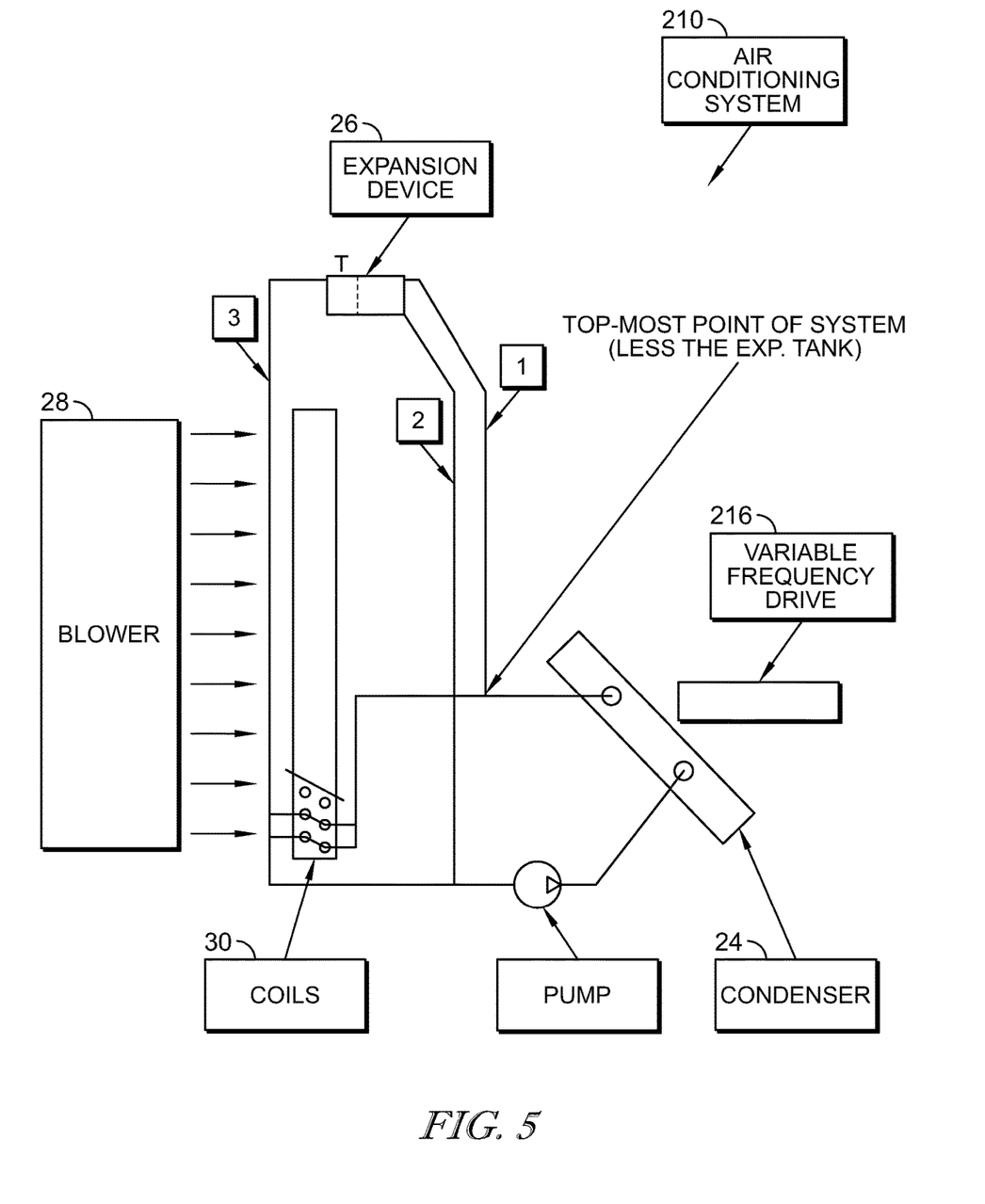
FIG. 5 is another diagrammatic view of the air conditioning system of FIG. 3.

A first embodiment of an air conditioning system 10 in accordance with the present disclosure is shown in FIGS. 1 and 2. The air conditioning system 10 includes a controller 14 comprising a frequency drive 16 and an air conditioner 12 connected with the variable frequency drive 16. The frequency drive 16 is located in a flow path of conditioned air 32 produced by the air conditioner 12 to cool the variable frequency drive 16 during use of the air conditioner 12. A second embodiment of an air conditioning system 210 in accordance with the present disclosure is shown in FIGS. 3-5. The air conditioning system 210 includes an air conditioner 212 and a controller 214. The controller 214 includes a liquid-cooled frequency drive 216 and a heat exchanger 234. The heat exchanger 234 is located in a flow path of conditioned air 32 produced by the air conditioner 212. In the illustrative embodiments, frequency drives 16, 216 comprise variable frequency drives.

The air conditioning system 10 is adapted for use in a vehicle (not shown) such as, for example, a bus. The air conditioning system 10 includes the air conditioner 12, the controller 14, and, optionally, an electric energy source 18 as shown in FIGS. 1 and 2. The air conditioner 12 is configured to provide conditioned air 32 for a passenger compartment of the vehicle. The conditioned air 32 may include air that has been cooled by an evaporator 22 of the air conditioner 12. The conditioned air 32 may include ambient air that is moved by a blower 28 toward the evaporator 22.

The controller 14 comprises the variable frequency drive 16 and the variable frequency drive 16 is configured to vary at least one of a frequency and a voltage of electric energy used to power the air conditioner 12. In embodiments that include the electric energy source, the electric energy source 18 is configured to provide the electric energy to the controller 14. The variable frequency drive 16 is located in the flow path of the conditioned air 32 to cause the conditioned air 32 to cool the variable frequency drive 16 during use of the air conditioning system 10.

The air conditioner 12 includes a compressor 20 and an evaporator 22 as shown in FIGS. 1 and 2. The compressor 20 is configured to be driven by the electric energy for example from electric energy source 18 to compress refrigerant (or other fluid). In the illustrative embodiment, the compressor 20 of the air conditioner 12 is driven directly by the electric energy. That is, the compressor 20 is an electrically powered compressor 20 and not powered by rotating energy, for example, from a motor.

When the refrigerant reaches the evaporator 22, the refrigerant absorbs heat from the surrounding atmospheric air and vaporizes to cool the air and produce the conditioned air 32 which is then blown out of the air conditioner 12 to cool the vehicle. Illustratively, the air conditioner 12 further includes a condenser 24 and an expansion tank 26 connected with the compressor 20 and the evaporator 22.

The illustrative evaporator 22 includes a coil 30 and a blower 28 as shown in FIGS. 1 and 2. The refrigerant is conducted through the coil 30 and the blower 28 directs a flow of air across the coil 30 to blow the conditioned air 32 out of the air conditioner 12.

The controller 14 is connected with the compressor 20 and configured to vary at least one of a frequency and a voltage of electric energy powering the compressor 20 to vary at least one of a speed and a torque of the compressor 20 to meet a desired cooling load of the air conditioning system 10. A thermal portion of the controller 14 produces heat during use of the controller 14. The thermal portion is located in a flow path of the conditioned air 32 so that that thermal portion of the controller 14 is cooled by the conditioned air 32 during use of the air conditioning system 10 as suggested in FIG. 1.

The frequency drive 16 may receive the desired cooling load from operator input. The frequency drive 16 drive may determine the desired cooling load.

In illustrative embodiments, the thermal portion of the controller 14 comprises one or more components and/or one or more portions of components of the controller 14. In illustrative embodiments, the thermal portion of the controller 14 is positioned downstream of the coil 30 of the evaporator 22 in a flow path of the conditioned air 32. In some embodiments, the thermal portion of the controller 14 is positioned upstream of the coil 30 of the evaporator 22 in a flow path of the blower 28.

Illustratively, the controller 14 comprises the variable frequency drive 16 and at least a portion of the variable frequency drive 16 comprises the thermal portion of the controller 14. As a result, at least a portion of the variable frequency drive 16 is located in the flow path of conditioned air 32.

The electric energy source 18 is configured to direct electric energy to the variable frequency drive 16 and/or to the compressor 20. Illustratively, the electric energy source 18 provides electric energy having a direct current. In illustrative embodiments, the electric energy source 18 comprises one or more of a battery, a capacitor, and a motor-generator. The battery and/or capacitor may be chemical, capacitive, or any other suitable alternative.

Illustratively, the air conditioning system 10 is incorporated into a vehicle. In some embodiments, the vehicle includes a powertrain and the air conditioning system 10. The powertrain includes a prime mover and wheels configured to be driven by the prime mover. In illustrative embodiments, the prime mover comprises a combustion engine. In other embodiments, the prime mover comprises an electric motor. The electric energy source 18 may be configured to be powered by energy produced by the prime mover. The electric energy source 18 may be further configured to start the prime mover.

The air conditioning system 210 is substantially similar to the air conditioning system 10 and includes the air conditioner 12, a controller 214, and, optionally, the electric energy source 18 as shown in FIGS. 3-5. The controller 214 includes the liquid-cooled variable frequency drive 216 and the heat exchanger 234 connected fluidly to the liquid-cooled variable frequency drive 216. The liquid-cooled variable frequency drive 216 is configured to vary at least one of the frequency and the voltage of electric energy used to power the air conditioner 12. At least a portion of the heat exchanger 234 is located in the flow path of the conditioned air 32 to cause the conditioned air 32 to cool the heat exchanger 234 during use of the air conditioning system 10. In some embodiments, the liquid-cooled variable frequency drive 216 is spaced apart from the flow path of the conditioned air such that the liquid-cooled variable frequency drive 216 is positioned out of the flow path of the conditioned air.

During use of the air conditioning system 210, a liquid is conducted through the heat exchanger 234 and the liquid-cooled variable frequency drive 216. The liquid is conducted through the liquid-cooled variable frequency drive 216 to remove heat from the liquid-cooled variable frequency drive 216. The warmed liquid is conducted through the heat exchanger 234 and the conditioned air 32 is conducted across the heat exchanger 234 to remove heat from and cool the liquid. The liquid may then be conducted to the liquid-cooled variable frequency drive 216 to cool the liquid-cooled variable frequency drive 216.

In some embodiments, the liquid is conducted directly from the heat exchanger 234 to the liquid-cooled variable frequency drive 216. In other embodiments, the liquid is conducted from the heat exchanger 234 to other components of the air conditioning system 210 before being directed to the liquid-cooled variable frequency drive 216. In some embodiments, the liquid continuously cools the liquid-cooled variable frequency drive 216. In some embodiments, the controller 214 further includes a valve that can be varied to adjust the flow of the liquid through the heat exchanger 234 and the liquid-cooled variable frequency drive 216.

In some embodiments, the frequency drive includes a fluid-cooled variable frequency drive. In some embodiments, the fluid used to cool the fluid-cooled variable frequency drive is a gas. In some embodiments, the heat exchanger 234 is located in a flow path of the blower 28 downstream of the evaporator 22. In some embodiments, the heat exchanger 234 is located in a flow path of the blower 28 upstream of the evaporator 22.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air conditioning system for use with a vehicle, the air conditioning system comprising:
   a powertrain of the vehicle, the powertrain including a prime mover that is an electric motor,
   an electric energy source configured to provide electric energy, the electric energy source being a battery coupled with the prime mover,
   an air conditioner including a compressor electrically connected with the electric energy source and driven by the electric energy provided by the electric energy source to compress refrigerant and an evaporator including a coil and a fan located relative to the evaporator such that the fan conducts air across the coil to provide conditioned air during operation of the air conditioner, and
   a controller that includes a frequency drive connected with the electric energy source and the compressor to direct the electric energy from the electric energy source to the compressor and to vary at least one of a frequency and a voltage of the electric energy to vary at least one of a speed and a torque of the compressor to meet a desired cooling load of the air conditioner, and
   wherein the controller is positioned in a flow path of the conditioned air to cause the conditioned air to cool the controller during use of the air conditioning system,
   wherein the frequency drive includes a liquid-cooled variable frequency drive and the controller further includes a heat exchanger fluidly connected with the liquid-cooled frequency drive, wherein at least a portion of the heat exchanger is positioned in the flow path of the conditioned air,
   wherein the electric energy source is configured to start the prime move, and wherein the compressor is electrically powered.

2. The air conditioning system of claim 1, wherein the variable frequency drive is positioned downstream of the coil.

3. The air conditioning system of claim 1, wherein the variable frequency drive is positioned upstream of the coil.

4. The air conditioning system of claim 1, wherein the frequency drive includes a thermal portion that generates heat during use and the thermal portion is positioned in the flow path of the conditioned air.

5. The air conditioning system of claim 1, further comprising a valve fluidly connected with the heat exchanger and configured to be varied to adjust a flow rate of liquid through the heat exchanger.

6. An air conditioning system for use with a vehicle, the air conditioning system comprising:
   an electric motor configured as a prime mover of the vehicle,
   an electric energy source configured to provide electric energy, the electric energy source being a battery connected with the electric motor, and the electric energy source being configured to start the electric motor,
   an air conditioner including a compressor driven to compress a refrigerant using the electric energy and an evaporator including a coil and a blower configured to conduct air across the coil to provide conditioned air during operation of the air conditioner, and
   a controller that includes a liquid-cooled variable frequency drive and an air-liquid heat exchanger, the liquid-cooled variable frequency drive connected with the electric energy source and the compressor the liquid-cooled variable frequency drive receives input from an operator indicative of a desired cooling load of the air conditioner, the liquid-cooled variable frequency drive directs the electric energy from the electric energy source to the compressor and varies at least one of a frequency and a voltage of the electric energy to vary at least one of a speed and a torque of the compressor to meet the desired cooling load of the air conditioner, and the air-liquid heat exchanger fluidly connected with the liquid-cooled variable frequency drive and configured to provide liquid to the liquid-cooled variable frequency drive, and
   wherein at least a portion of the air-liquid heat exchanger is positioned in a flow path of the blower to cause the air to cool the air-liquid heat exchanger during use of the air conditioning system, and wherein the compressor is electrically powered and electrically connected with the electric energy source via the liquid-cooled variable frequency drive.

7. The air conditioning system of claim 6, wherein the liquid-cooled variable frequency drive is spaced apart from the flow path of the blower such that the liquid-cooled variable frequency drive is positioned out of the flow path of the blower.

8. The air conditioning system of claim 7, further comprising a valve fluidly coupled with the heat exchanger and configured to be varied to adjust a flow rate of the liquid through the heat exchanger.

* * * * *